United States Patent
Prellwitz et al.

(10) Patent No.: US 8,799,111 B2
(45) Date of Patent: Aug. 5, 2014

(54) SYSTEMS AND/OR METHODS FOR SELLING NON-INVENTORY ITEMS AT POINT-OF-SALE (POS) LOCATIONS

(75) Inventors: Jeremy Prellwitz, Redmond, WA (US); Elaine Unger, Redmond, WA (US)

(73) Assignee: Nintendo of America Inc., Redmond, WA (US)

( * ) Notice: Subject to any disclaimer, the term of this patent is extended or adjusted under 35 U.S.C. 154(b) by 264 days.

(21) Appl. No.: 13/464,400

(22) Filed: May 4, 2012

(65) Prior Publication Data

US 2013/0297435 A1 Nov. 7, 2013

(51) Int. Cl.
*G06Q 30/00* (2012.01)
*G06Q 30/06* (2012.01)

(52) U.S. Cl.
CPC .................. *G06Q 30/0635* (2013.01)
USPC ........ 705/26.81; 705/26.1; 705/330; 705/340

(58) Field of Classification Search
CPC ................................................ G06Q 30/0635
USPC .............................. 705/26.1, 26.81, 330, 340
See application file for complete search history.

(56) References Cited

U.S. PATENT DOCUMENTS

| | | | |
|---|---|---|---|
| 5,978,774 A | 11/1999 | Rogers et al. | |
| 6,018,719 A | 1/2000 | Rogers et al. | |
| 6,085,172 A | 7/2000 | Junger | |
| 6,947,941 B1 | 9/2005 | Koon | |
| 8,644,983 B1 * | 2/2014 | Barua et al. | 700/216 |
| 2008/0208695 A1 * | 8/2008 | Condron | 705/14 |
| 2010/0235290 A1 * | 9/2010 | Junger et al. | 705/304 |
| 2011/0208649 A1 * | 8/2011 | Shader et al. | 705/40 |
| 2011/0251911 A1 | 10/2011 | Junger et al. | |

* cited by examiner

*Primary Examiner* — Ryan Zeender
*Assistant Examiner* — Hunter Wilder
(74) *Attorney, Agent, or Firm* — Nixon & Vanderhye PC

(57) ABSTRACT

Certain exemplary embodiments relate to techniques for order processing. A data feed including unique identifiers of purchased products, together with pairs of order numbers and product identifiers for products ordered from, but not delivered by, a store, is received at an electronic registration system. For each entry therein, a corresponding record in an ER database is created, and a message is transmitted to a supplier of an ordered product indicating that payment has been received for that product when it is determined that the entry is a corresponding order number/product identifier pair. This determination may be based on different masks used in creating a part of the unique identifier, and the order number, respectively. An indication that a product has been or is being shipped, along with a serial number for that product, is received from the supplier, and the ER database is updated as appropriate.

22 Claims, 4 Drawing Sheets

SYSTEMS AND/OR METHODS FOR SELLING NON-INVENTORY ITEMS AT POINT-OF-SALE (POS) LOCATIONS

TECHNICAL FIELD

The technology disclosed herein relates to electronic registration (ER) techniques. More particularly, the technology disclosed herein relates to techniques enabling non-inventory items to be sold at a point-of-sale (POS) (e.g., retailer) location or store and shipped from a fulfillment center (e.g., on behalf of the manufacturer) to a place of the purchaser's choosing, while bypassing logistical operations associated with the intermediate delivery to and/or processing by the POS location or store. In certain exemplary embodiments, order numbers are transparently passed through systems at the POS location or store as if they were serial numbers or the like, and an ER system is able to identify these entries in a data feed in order to provide proof-of-purchase information to the product fulfillment center.

BACKGROUND AND SUMMARY

There are a number of advantages associated with direct shipping from a product fulfillment center to a customer. Such advantages include, for example, enabling the retailer, e-tailer, or other party selling the products to maintain a smaller stock. Another advantage involves reducing the overhead for the seller, as stockroom/storage space can be reduced by virtue of the fewer products received for sell-through. Costs associated with logistical operations also may be saved, e.g., as products can be shipped directly from fulfillment centers to purchasers. The seller also may not have to predict or guess how many products might possibly sell in a given time period, thereby reducing risks associated with over- and under-ordering. These savings can be significant when physically large items and/or large quantities of items are implicated. Such savings may be at least partially passed on to the consumer, and/or retained for the seller and/or manufacturer. These advantages have helped give rise to pure e-tailers, and have made it advantageous for many more traditional retailers to set up similar online presences or storefronts. Amazon.com, for example, is an example of a particularly successful e-tailer that maintains very low actual inventory and has very good supply chain integration, sometimes enabling direct (or at least more direct) shipping from a product fulfillment center to a purchaser.

While e-tailers, web-based storefronts, online portals, and the like have become very popular, many people still like the experience of going to a physical brick-and-mortar store. This experience for some is important, because they can actually touch the product before deciding whether to purchase it, view products side-by-side, and/or interact with a "real live person" (e.g., a sales clerk, etc.) to ask questions, get feedback or receive recommendations, etc. Moreover, some people still do not feel that online transactions are safe, which may lead them to favor brick-and-mortar stores over online purchases.

It therefore will be appreciated that there is a tension between operating a brick-and-mortar store and "virtualizing" practically everything about the in-store sales experience. Thus, it will be appreciated that there is a need in the art for brick-and-mortar stores to gain at least some of the benefits associated with a more online sales approach.

One aspect of certain exemplary embodiments relates to an in-store kiosk that enables a customer to place an order for a product to be delivered from a product fulfillment location to a place of that person's choosing (e.g., home, office, etc.), without having to receive and/or process that product through the store.

Another aspect of certain exemplary embodiments relates to techniques for providing proof-of-purchase for in-store electronic purchases (e.g., through a kiosk as noted above), but without disrupting the in-store location's normal point-of-sale (POS) process.

Still another aspect of certain exemplary embodiments relates to coordinating the sharing of data between the kiosk, the in-store location's normal POS operations, and the manufacturer's product fulfillment center.

According to certain exemplary embodiments, techniques are provided for the detection of order numbers in a data feed from a store to an electronic registration (ER) or other centralized system, e.g., in a manner that that helps differentiate order numbers from serial numbers. An order number mask may be seamlessly integrated into a POS system, e.g., to help disguise an order number as a serial number that is created in connection with its own mask. These different numbers may be identified and separated, e.g., using the masked combination of UPC and order number, or the like. Once an order number has been detected in the POS data feed, it may be separated out and recognized as an order number. It then may be determined that a corresponding serial number is missing, which may cause a communication to be sent to the manufacturer that payment for a UPC/order number combination is made and that a product should be shipped. Products therefore are able flow through the retailer's system without change, and proof-of-purchase capabilities are provided even when ordering and purchasing activities are separated from each other.

One advantage that becomes possible by using this technique is that a manufacturer, logistics provider, or other party, may be sent a confirmation of payment of an "order," rather than a "serial number." Order numbers are allowed to flow through the retailer POS system undetected, and to be detected at a downstream location for these and/or other purposes.

In certain exemplary embodiments, a manufacturer's kiosk will be placed in a store, and consumers will be able to order directly from the kiosk, with direct shipment from the manufacturer to places of the consumers' choosing. An order confirmation will be generated by the kiosk, and the consumer will then proceed to the stores register for purchase. The order confirmation may serve as the product and may include a UPC and "serial number" for scanning. This procedure advantageously will not interrupt standard operating procedures at the store, and data transmission from the store to an electronic registration (ER) service provide may remain constant. However, the "serial number" generated by the kiosk may instead be an appropriately masked order number instead of a unique identifier for the item to be purchased. The ER system may understand that this is the case, and implement a transmission data feed to the manufacturer. When the manufacturer fulfills the order, a real product serial number (possibly together with the UPC and order number as serial number information) may be transmitted to the ER system for registration According to certain exemplary embodiments, an order processing system is provided. A computer-based kiosk is provided to a point-of-sale location. The kiosk is configured to (a) enable consumers to order, but not purchase, products that are not stocked by the POS location, (b) generate order numbers for ordered products, with the order numbers being formatted in accordance with a first mask, and (c) generate, for a consumer who has ordered at least one product, an article including an order number and a product identifier for each said product being ordered. A computerized POS checkout system is provided to the POS location. An electronic registration system includes at least one processor and an ER database, with the ER system being configured to receive from the POS checkout system a data feed including unique identifiers of purchased products and create corresponding entries in the ER database. At least a portion of the unique identifiers is formatted in accordance with a second mask, the second mask being different from the first mask. The POS checkout system is configured to: process a generated article in order to complete a sale of each product ordered through the kiosk and associated with the article, and treat the order number and the product identifier pair of each said product associated with the generated article as if they together were a unique identifier of the corresponding ordered product and include this information in the data feed. The ER system is further configured to: analyze the data feed in order to separate out order number and product identifier pairs, from unique identifiers, and send a first message indicating that payment has been received to a supplier of each product being ordered in a case that a corresponding order number and identifier pair is detected in the data feed.

According to certain exemplary embodiments, an electronic registration system is provided. Processing resources include at least one processor and a memory. An ER database is configured to store records of purchased products. A return/warranty qualification module, under control of the processing resources and in response to a return/warranty eligibility inquiry, is configured to issue a return/warranty qualification. A connection to a store's checkout system is provided. The ER system is configured to receive, via the connection, a data feed from the checkout system, with the data feed being formatted to include unique identifiers of purchased products, as well as pairs of order numbers and product identifiers for products ordered from, but not delivered by, the store. Program logic, under the control of the processing resources and for each entry in the data feed, is configured to: create a corresponding record in the ER database, determine whether the entry is either a unique identifier of a purchased product, or an order number/product identifier pair for a product ordered at the store, and transmit an electronic message to a supplier of the product ordered at the store indicating that payment has been received for that product ordered at the store, when the program logic determines that the entry is an order number/product identifier pair.

According to certain exemplary embodiments, a method of processing an order is provided. An order for a product that is sold but not stocked by the store is received, via a computer provided to a brick-and-mortar store, but the computer is prevented from actually selling the ordered product. An order number for the ordered product is generated, using the computer, with the order number being formatted in accordance with a first mask. A receipt for the ordered product is printed, with the receipt including the order number and a product identifier for the ordered product. The receipt is processable by a checkout system of the store so as to complete a sale of the ordered product, with the order number being treated as if it were a serial number formatted in accordance with a second mask that is different from the first mask. A centralized computer system is configured to (a) receive from the checkout system a data feed including entries for both unique identifiers of purchased products and order numbers for ordered products, and (b) generate messages confirming to one or more suppliers, as appropriate, that payment has been received for entries in the data stream that correspond to ordered products.

According to certain exemplary embodiments, a method of processing orders for products placed at, but not delivered by, a retailer is provided. A data feed including unique identifiers of purchased products, as well as pairs of order numbers and product identifiers for products ordered from, but not delivered by, the store is received from a point-of-sale system of the retailer and over a computer network connection. For each entry in the data feed, and in connection with at least one processor: a corresponding record is created in an electronic registration database; it is determined whether the entry is either a unique identifier of a purchased product, or an order number/product identifier pair for a product ordered at the retailer; and an electronic message is transmitted to a supplier of the product ordered at the store indicating that payment has been received for that product ordered at the store, when it is determined that the entry is an order number/product identifier pair. An indication that a product has been or is being shipped, along with a serial number of the product that has been or is being shipped, is received from the supplier, and the corresponding record in the ER database is updated with the serial number.

Programmed logic circuitry may include, for example, any suitable combination of hardware, software, firmware, and/or the like. A computer-readable storage medium may include, for example, a disk, CD-ROM, hard drive, and/or the like, and thus may be transitory or non-transitory in nature. Instructions may be stored on a non-transitory computer readable storage medium that, when executed (e.g., by a processor of one or more computers or computer systems), perform the methods described herein.

The exemplary embodiments, aspect, and advantages described herein may be used in any suitable combination or sub-combination such that it is possible to obtain yet further embodiments of the instant invention.

BRIEF DESCRIPTION OF THE DRAWINGS

Aspects and characteristics of the exemplary illustrative non-limiting implementations will become apparent from the following detailed description of exemplary implementations, when read in view of the accompanying drawings, in which.

DETAILED DESCRIPTION

Figure 1:
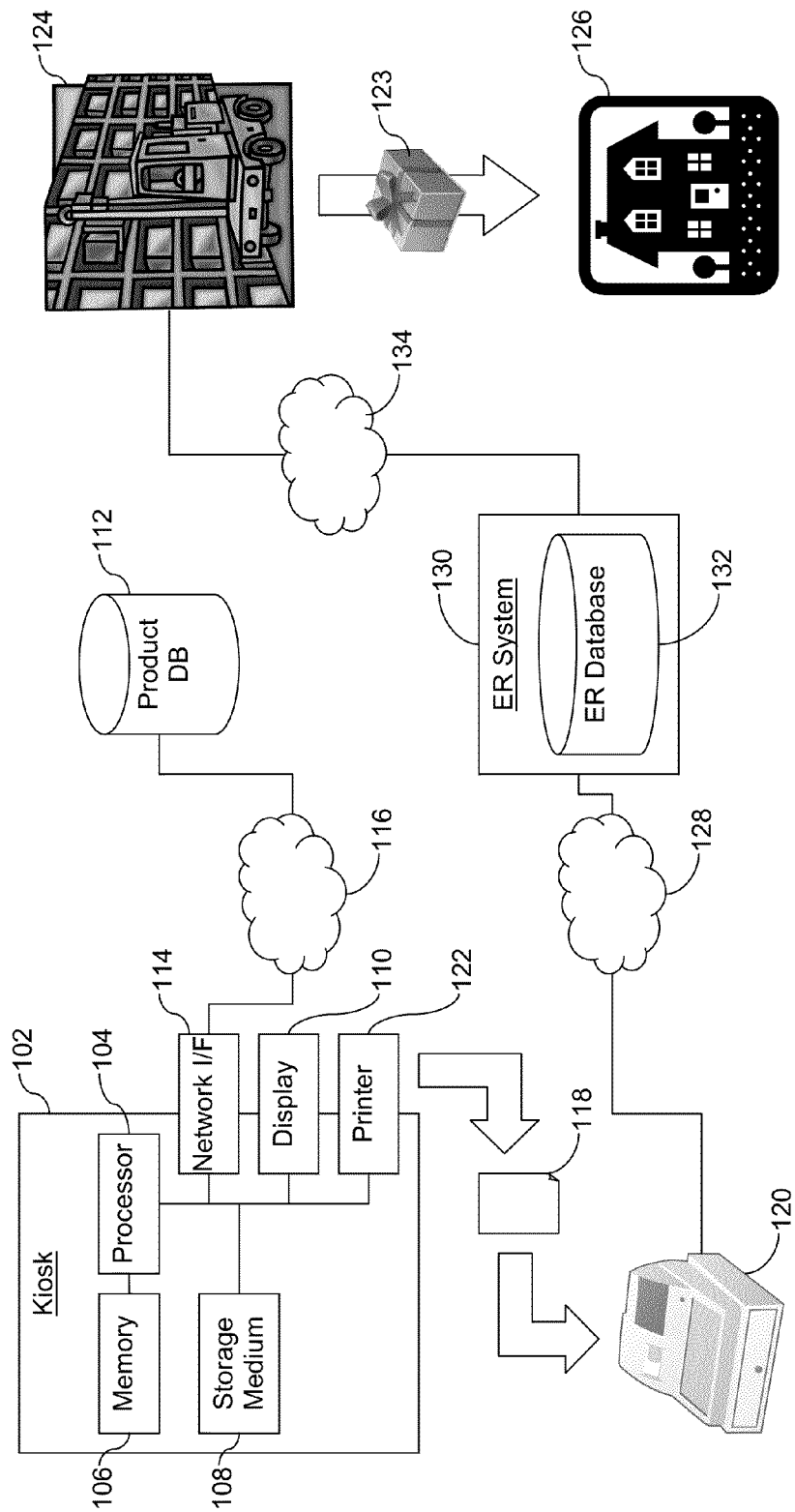
FIG. 1 is an example block diagram showing a system for order fulfillment in accordance with certain exemplary embodiments.

It will be recognized by those of ordinary skill that modification, extensions and changes to the disclosed exemplary implementations may be made without departing from the scope and spirit of the invention. In short, the present invention is not limited to the particular forms disclosed herein.

In certain exemplary embodiments, a customer may use an in-store kiosk to place an order for a product to be delivered from a product fulfillment location to a place of that person's choosing (e.g., home, office, etc.). In other words, the store where the kiosk is located need not necessarily stock the product, or products like it, and a product purchased through the kiosk may be more directly shipped to the place of that customer's choosing, e.g., without having to be shipped to or processed through the store. The kiosk may operate substantially independently from the store's normal point-of-sale (POS) system. Certain exemplary embodiments therefore may help provide proof-of-purchase for items sold using the kiosk, but in a manner that accounts for this separation.

It oftentimes would be desirable to avoid interrupting a POS location's normal POS-related activities, while providing direct shipment of "virtual" (e.g., not stocked) products and deployment of "virtual" (e.g., not on-site and/or not immediately available) services in response to a customer's order for the same through an in-store kiosk or the like. This desire, combined with the fact that a kiosk may be owned, operated, and/or managed by a manufacturer or third-party not associated with the location in which it is deployed, may in at least some cases effectively prevent payment and/or proof-of-purchase transactions from being processed directly through such kiosks. Thus, there is a challenge in providing proof-of-purchase for a virtual product or service through a retail location's POS system without interrupting the current process of, for example, scanning a product UPC and serial number. In other words, because there is a direct shipment from a fulfillment center to a consumer, and because a kiosk likely will be staffed by a representative of the manufacturer rather than the POS location (if it staffed at all), there is a problem in making sure that payment is received at a POS location before shipping the product the user, because payments is not performed at the kiosk. There is a conflict because the POS flow cannot be interrupted, but there is a need to ensure that payment is received.

Advantageous aspects of virtualizing at least some of a store's operations are set forth above and may include, for example, reduced inventory, reduced overhead enabled by a reduction in the required storage spaced, increased bottom line revenue (e.g., from savings on overhead, avoiding of shipping and storage costs, etc.), large product offerings for retailers and manufacturers, etc. Further advantageous aspects relate to the ease with which live consumers may be handled and/or the ease with which products can be delivered and/or services deployed. Still further advantageous aspects relate to providing a "gentle" introduction to some computerized techniques, while still presenting a familiar in-store operation.

Certain exemplary embodiments address the above-described issues and enable some or all of the above-described and/or other advantages to be realized. In some cases, by working with a retailer, manufacturer, distributor, and/or other partner, it is possible to identify or create an optionally unique order tracking number that is of a materially different format than the product UPC but is still similar in at least size, content, and processability, to a conventional serial number. Thus, certain exemplary embodiments implement multiple masks—one for an actual serial number, and another for an order tracking number.

The inventors of the instant application have discovered that by treating an order number as if it were a serial number, it becomes possible to push this very different kind of information through a retailer's POS system without causing disruptions therein. Thus, manufacturers, logistics providers, and/or product fulfillers may be encouraged to make their order numbers appear as if they were serial numbers. Masking techniques may be used to distinguish between "regular" product serial numbers, and order numbers, so that the very different information that is processed in the same basic data feed(s) can be processed accordingly. It is noted that this technique may result in many orders with the same serial number field. Thus, pairing such information with a UPC can help to distinguish among the various otherwise seemingly identical orders. In other words, in certain exemplary embodiments, an order number/UPC combination may be unique.

Example masking applications are disclosed in, for example, U.S. Pat. No. 6,947,941, the entire contents of which are hereby incorporated herein by reference. Further example masking applications are disclosed in, for example, U.S. Publication No. 2011/0251911, the entire contents of which are hereby incorporated herein by reference. Both references are commonly assigned. The '911 publication also discloses techniques for ascertaining serial number structure and intelligence, which may be beneficial in connection with the example techniques described herein.

Referring now to the drawings, FIG. 1 is an example block diagram showing a system for order fulfillment in accordance with certain exemplary embodiments. The kiosk 102 shown in FIG. 1 includes processing resources such as, for example, at least one processor 104 and a memory 106. The storage medium 108 may be any suitable transitory or non-transitory computer readable storage medium (e.g., RAM, ROM, a hard disk drive, solid state drive, flash drive, and/or the like). It also may store a program that, when executed by the processing resources, may cause the kiosk 102 to operate. For instance, a series of screens may be displayed to the user via the display 110, which itself may be a touch screen display device or the like. A potential customer may interact with the kiosk 102 via the display 110, the screens displayed thereon, and/or any suitable human-computer interaction hardware elements connected thereto (e.g., a keyboard, mouse, trackball, etc.). Although one kiosk 102 is shown in FIG. 1, it will be appreciated that a plurality of kiosks may be provided to a single store. It also will be appreciated that multiple kiosks may be provided to multiple stores.

A product database 112 may include information concerning the products available for sale. Such information may include, for example, the product name, description, serial number, UPC, price, etc. The product database 112 may be a part of a computer system including, for example, a computer comprising at least one processor, and may be remotely updatable via a manufacturer user interface by the manufacturer of the products stored therein, e.g., to add, remove, or delete products available for sale, etc. It also may be updatable via the retailer, e.g., in connection with a retailer user interface, to indicate which products may be sold at a given store, to provide pricing information, etc.

The product database 112 is shown external to the kiosk 102 in the FIG. 1 example arrangement, and it therefore may be accessible via a network interface 114 of the kiosk 102 over a network connection 116. In certain exemplary embodiments, multiple such product databases may be provided for multiple manufacturers, respectively. In other exemplary embodiments, a single product database may include product information for one or more manufacturers. In cases where a single product database 112 store product information for a plurality of manufacturers, a manufacturer may have permission to edit only its products. In some implementations, the product database 112 may be updateable only via the manufacturer and, in at least some of these scenarios, retailer price-related information may be stored separately.

Figure 2:
FIG. 2 is an example order confirmation receipt in accordance with certain exemplary embodiments.

Once a customer has placed an order through the kiosk 102, an order confirmation receipt 118 may be generated. An example order confirmation receipt 118 is shown in FIG. 2. As can be seen from the FIG. 2 example, the order confirmation receipt 118 may include information concerning the order such as, for example, an order date/time, a purchase order (PO) number, a store number from which the product was placed, detailed information concerning the product(s) purchased, and/or the like. The detailed information concerning the product(s) purchased, in turn, may include for each product ordered, for example, a description of the product, a model number, an item number, a quantity, price, etc. Shipping information also may be provided. Such shipping information may include, for example, the name of the purchaser, an address, phone number, an expected delivery date, special delivery instructions, etc.

As indicated on the FIG. 2 example the order confirmation receipt 118 (and referring once again to FIG. 1), the purchase may not be complete until the customer takes the receive 118 to the POS register 120. In some cases, the receipt may be a physical printed product (e.g., a piece of paper, a card, etc.), that may be generated by the printer 122 connected to the kiosk 102. In other cases, an electronic receipt may be generated and emailed, SMS or MMS messaged, or otherwise electronically delivered to the customer for subsequent presentation at the register 120. In some cases, an electronic product code may be generated, and an RFID tag may be generated for the product to present to the cashier.

Although the FIG. 2 example receipt shows one possible layout, it will be appreciated that additional modifications are possible. For instance, it will be appreciated that more or fewer items may be shown per page, the data may be reorganized with a single page or across multiple pages, etc. In some cases, it may be possible to provide four items per page (regardless of whether such items are services or products). Items may be carried over to a second page if they do not fit. The items may be displayed in any order including, for example, alphanumeric order, the order that they are entered, by price or quantity, etc. In some cases, the order number as serial number may be constant for all items. However, in other implementations, an order number as serial number may be constant for a single brand, but may change from brand-to-brand, even within a single order. Even though the order number as serial number may in some cases change, it still may have the same format (e.g., mask).

Once the consumer presents the receipt 118 to the cashier and pays for the product(s), the process may be considered complete from the consumer's end. Assuming that the transaction goes through (e.g., a credit card is not declined, etc.), an item 123 corresponding to the product purchased may be shipped from the order fulfillment location 124 to the place(s) 126 specified by the consumer using the kiosk 102.

It will be appreciated from the above that operation of the kiosk is substantially independent of the retailer's normal POS system. More particularly, the retailer's normal POS system is not meaningfully involved until the receipt 118 is actually presented at the register 120.

In addition to the consumer-related steps, a number of transactions also take place in the background and are not apparent to the consumer. For example, an order shipping number may be generated when the order is placed at the kiosk. This order shipping number may actually be represented as a serial number on the receipt 118, and it optionally may be transmitted to the order fulfillment center 124 after it is generated (and potentially before the product is actually paid for at the register 120). When the cashier at the POS location scans the UPC and order number as serial number as per normal store operations, this information may be transmitted or stored for later batch transmission over a network connection 128 to an electronic registration (ER) system 130 that includes at least an ER database 132 (e.g., that operates under the control of at least one computer having at least one processor, etc.). The ER database 132 may store such information (potentially along with return/warranty policy information, date/time of sale, transaction number, etc.) for return/warranty qualification return purposes. See, for example, U.S. Pat. Nos. 5,978,774; 6,018,719; and 6,085,172, the entire contents of which are hereby incorporated herein by reference.

The ER system 130 also may relate relevant UPC and order number as serial number information to the manufacturer (e.g., the product fulfillment center 124) over a network connection 134 so that items corresponding to the products purchased may be actually shipped. By having the ER system 130 provide this data to the manufacturer, it becomes possible to ensure that the products actually have been ordered and paid for by the relevant consumers, while also associating the transaction with a specific order number. When the manufacturer actually ships the products, the actual serial number of the product may be sent back to the ER system 130 for storage in the ER database 132, together with the order number. Again, this transmission may be accomplished in substantially real-time, in batch, at periodic intervals, etc. As alluded to above, the ER system 130 may assist with future inquiries (e.g., store returns, warranty requests, call center inquiries, product recalls, etc.). This is made possible because the actual product serial number is stored, along with the order number (and potentially the UPC). In other words, unique identifiers are stored in the ER database 132 for both the product and the order.

Figure 3:
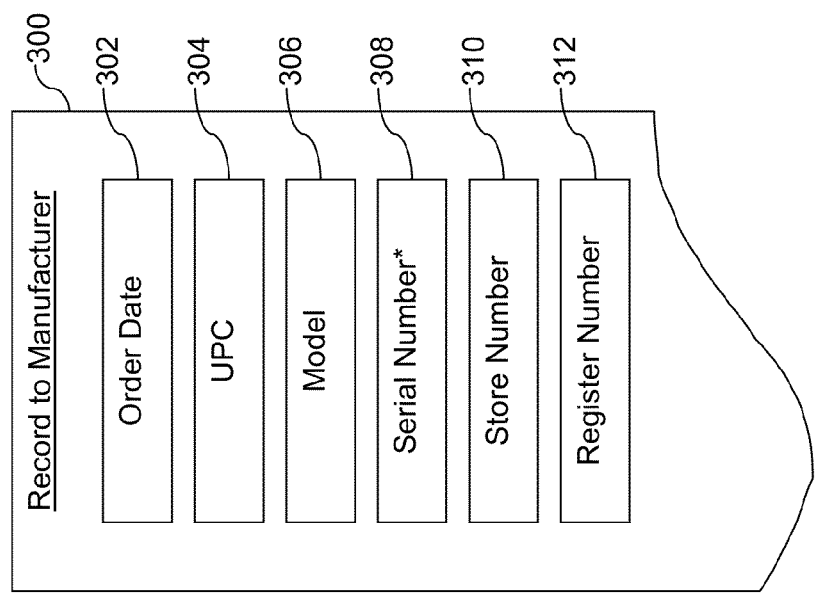
FIG. 3 is an example data structure that may be provided to a manufacturer by the electronic registration (ER) database in accordance with certain exemplary embodiments.

FIG. 3 is an example data structure that may be provided to a manufacturer by the ER database in accordance with certain exemplary embodiments. It will be appreciated that this data may be provided in any suitable format and via any suitable medium. As indicated above, it also may be delivered substantially in real-time, at regular intervals (e.g., daily, nightly, hourly, etc.), or in batch. For example, a CSV comma- or otherwise-delimited text file with a standardized and optionally separately defined header and footer may be emailed or otherwise transmitted from the ER system 130 over a network connection to a manufacturer, e.g., nightly.

The example record 300 may include some or all of the following and/or other data: the order date 302 (optionally with a time), the UPC of the product 304, the model number 306, the serial number 308 which actually is the order number, the store number 310, and the register number 312. It will be appreciated that the model number information 306 may be provided as a double-check as against the UPC. The serial number 308, which actually is the order number, may be generated by the kiosk 102. In fact, in some scenarios, all of the information except for the register number 312 may be generated by the kiosk 102 and optionally stored in human or non-human readable format on the receipt 118. The register number 312 may be generated at the register 120 in the store, as the kiosk 102 may not necessarily know where the consumer ultimately will check out. Although not shown in FIG. 3, an identifier of the kiosk used to place the purchase may be transmitted as well.

Figure 4:
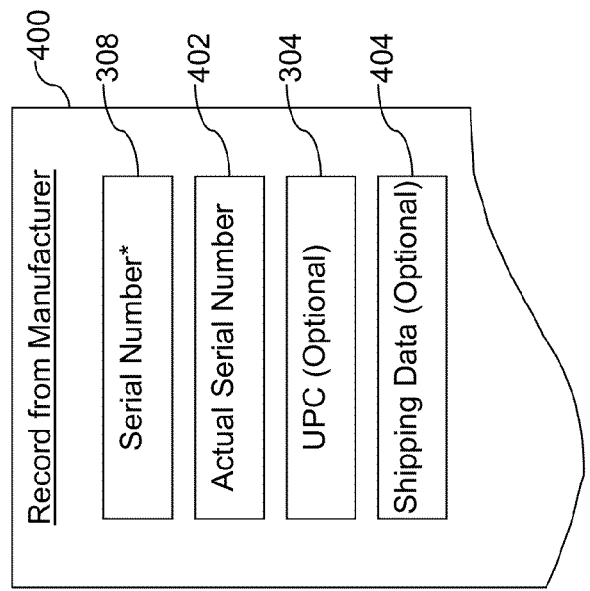
FIG. 4 is an example data structure that may be provided to the ER database from the manufacturer in accordance with certain exemplary embodiments.

As indicated above, some or all of the information shown in FIG. 3 may be transmitted to the manufacturer. FIG. 4 is an example data structure that may be provided to the ER database from the manufacturer in accordance with certain exemplary embodiments. This record 400 may include the same serial number 308 that actually is the order number, e.g., for matching purposes. The UPC 304 optionally may be transmitted back to the ER database as a cross-reference or double check that the correct record is being updated. The actual serial number 402 of the item that is being shipped may be included, as may optional shipping data 404 (e.g., shipping or logistics provider, tracking number, estimated delivery date, etc.). The ER database may add this information to its records, e.g., to facilitate subsequent return/warranty qualifications, call center lookup operations, etc., as indicated above.

The example techniques described herein may be advantageous for a number of reasons. For example, the receipt 118 may be generated and treated as the product to be purchased. Thus, a store clerk will have already been trained on how to proceed with the transaction. That is, the store clerk may know to simply scan the unique identifier. In the FIG. 2 example, this is a product UPC and "serial number." Neither the store clerk, nor the consumer, need be aware of the fact that the serial number may instead be an order number. Instead, this detail may be handled by the ER system 130.

Figure 5:
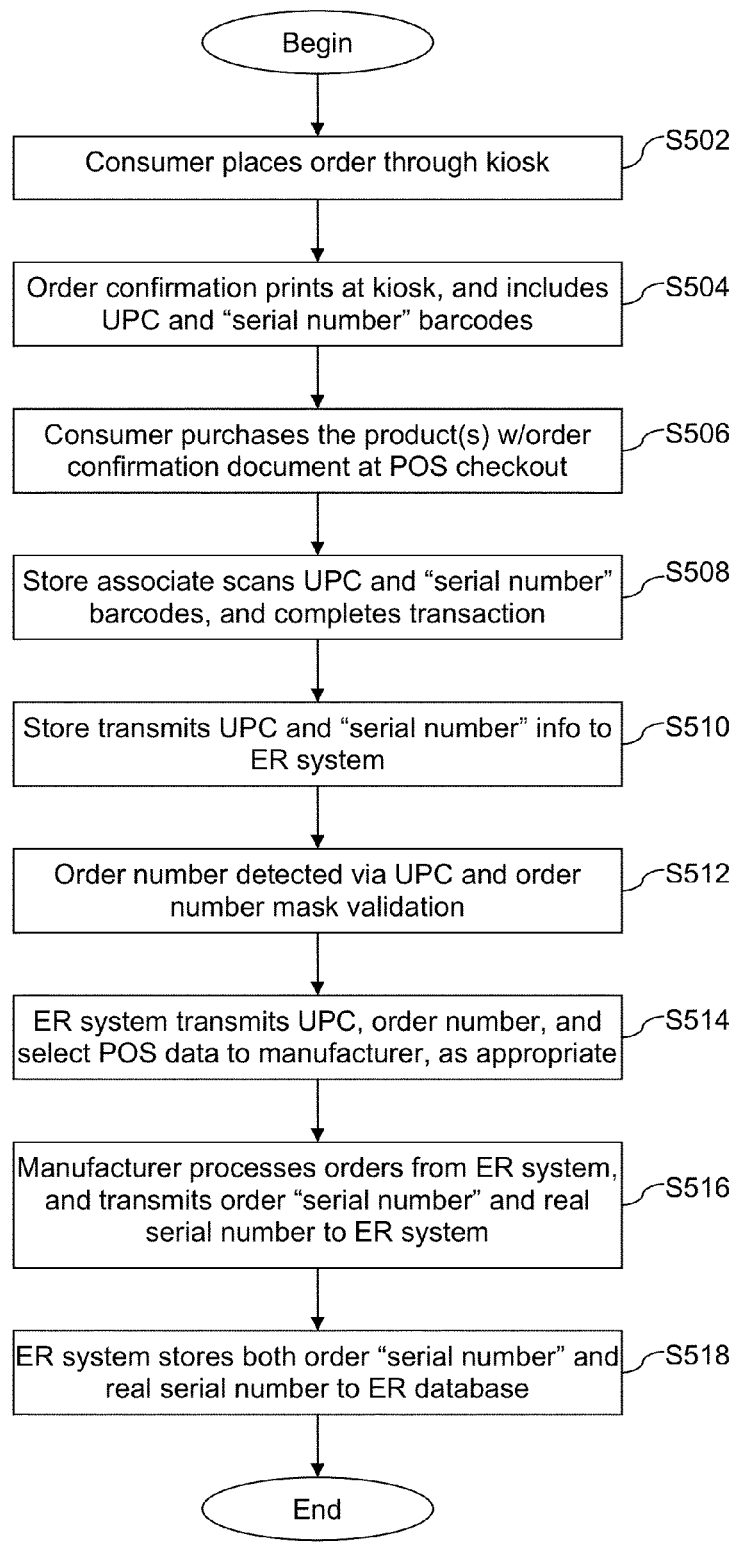
FIG. 5 is an example flowchart showing, at a high level, an illustrative process for shipping items from a manufacturer to a purchaser, and maintaining associated records in an ER database, in accordance with certain exemplary embodiments.

FIG. 5 is an example flowchart showing, at a high level, an illustrative process for shipping items from a manufacturer to a purchaser, and maintaining associated records in an ER database, in accordance with certain exemplary embodiments. In step S502, a consumer places an order though a kiosk. In certain exemplary embodiments, multiple kiosks may be provided, and the kiosks optionally may be "branded," e.g., by manufacturer or the like. Thus, in certain exemplary embodiments, a particular kiosk may sell only a partial subset of the items in the store and, in some cases, a particular kiosk may sell only a partial subset of the items eligible for purchase via the kiosk-inclusive system generally. The customer may be aware of the product(s) to be purchased, e.g., from prior searching in connection with the kiosk, an Internet-based or paper catalog, or the like, by consulting a more conventional "mailer" (e.g., of the type oftentimes delivered through the mail), after having browsed through the retail location and/or speaking with a sales representative, etc.

Once the order is placed, an order confirmation prints at the kiosk in step S504. This order confirmation may include UPC and "serial number" information. For instance, a combination of two- or three-dimensional barcodes and/or text may be provided, optionally together with at least human-readable text with potentially the same information. Of course, in different embodiments, other non-item level identifiers may be used in place of a UPC (e.g., an EAN, JAN, or the like). The "serial number" included on the printout is not the actual serial number of an item being sold. Instead, the "serial number" actually is an indication of a possibly unique order tracking number or the like. This order tracking number may be generated on-the-fly at the kiosk in certain exemplary embodiments. A single order tracking number may be generated for a single consumer in some instances. However, multiple order tracking numbers may in some cases be generated where, for example, a single consumer orders products from multiple manufacturers, products are to be fulfilled from different fulfillment centers, etc. The kiosk may be configured to determine when to generate different order numbers based on, for example, information stored in the product database (e.g., for products produced by a single manufacturer but being shipped from different fulfillment centers), by the fact that different manufacturer tags are provided in a single product database, when multiple different product databases are involved in a single purchase, etc.

In step S506, the consumer purchases the product(s) indicated on the printout at the POS location's register, e.g., in accordance with a more conventional sale and in accordance with the store's standard operating procedures. Thus, a store sales clerk may complete the transaction in step S508 by scanning the barcode or otherwise entering in the UPC and "serial number" (or equivalent) information. The printout may include a clear indication as to whether the product is available for in-store pickup, or whether it is a delivery item. This may help improve the flow at the consumer checkout queue.

In step S510, the store may transmit the captured UPC and "serial number" information to the ER system. This may be performed in accordance with the store's normal POS transactions and ER registration techniques. That is, the UPC and "serial number" information for the direct delivery purchased products may be passed on to the ER system as if it were normal POS transaction data. This is enabled by masking the order number in a format that is similar to item-level masks and compatible with the data flow that the system is expecting. Thus, the "regular" (and oftentimes only daily) data feed from the POS location may include both order tracking numbers/UPC combinations, as well as the more typical "actual" serial number/UPC combinations.

The ER system may include program logic configured to extract transactions from the retailer POS' data feed that match products configured for this process. For instance, a module running on the ER system may scan the incoming data feed and know that certain UPCs from the retailer streaming in the data can only come from a kiosk-type order. In other cases, a module running on the ER system may recognize that the data is masked differently and know that the transaction is associated with a kiosk-type order. In step S512, the order number is detected via UPC and order number mask validation. The ER system may relay data associated with these records to the manufacturer and/or the party responsible for shipment in step S514. The data relayed may include, for example, the UPC, "serial number" (which actually is the order number), and possibly some POS-specific data (e.g., date/time of order, store/register number, etc.). This data may help serve as a confirmation that a particular UPC/order number combination has been paid for and processed through the POS system as expected.

The manufacturer or party responsible for shipment may then process the orders based on the data received from the ER system. Products may be scanned as they are processed for shipment, and the order "serial number" and real serial number may be transmitted back to the ER system in step S516 (e.g., on a nightly basis). Other data may be included in this return feed including, for example, UPC, shipment date, courier name, courier tracking number, etc. In addition, in certain exemplary embodiments, an email or other message may be generated in order to alert the purchaser that the order has been shipped and to provide the purchaser with tracking and/or other information.

The ER system may store both the order "serial number" and the real serial number to its ER database in step S518. The ER system may in some cases use the order "serial number" to enhance its more typical serial number inquiry service. For example, customers optionally may be able to use their order tracking numbers (or shipment tracking numbers) in lieu of a product's serial number to pre-screen products' return/warranty eligibility as to a retailer, manufacturer, or other party. Retailers similarly may be able to use this information to check return/warranty eligibility as to a manufacturer or other party. Manufacturers can use order tracking numbers (or shipment tracking numbers) to perform similar look-ups on request from a customer, retailer, or other individual.

In certain exemplary embodiments, steps S516 and S518 may be optional. For example, the "real" serial number may not be received from the manufacturer. These steps may be practiced, however, if the manufacturer wants to benefit from more conventional retailer return/warranty request capabilities of the ER system.

It is noted that the example techniques described herein can be used for in-store pick-up or layaway. This may be done in certain example instances by simply treating the store location (which may be pre-programmed in or otherwise accessible to the kiosk) as the "ship-to" address. This may even in some cases be useful in creating the illusion that the store actually stocks a huge amount of inventory, even though it is being delivered "just in time" for in-store pick-up or when a layaway period is over.

In certain exemplary embodiments, it may be desirable to prevent as much personal information from being stored in the ER database as possible, e.g., for privacy purposes. As alluded to above, it is possible in certain exemplary embodiments to have the kiosk send order information to a manufacturer or shipper location, directly, thereby bypassing the ER system for at least this information. In such scenarios, the ER database will still work as intended, receiving order numbers as serial numbers, UPCs, and other relevant POS data. However, the more personal data may be delivered directly to the manufacturer and/or shipper. When this is the case, the ER database may simply provide confirmation to the manufacturer or shipper that an order has been placed and paid for by passing the order number as serial number and UPC along, potentially absent any personal information identifying the purchaser. The example aspects described above still may function in much the same ways. However, by forcing the separation of personal information from the ER system, it may be possible to at least partially address at least some privacy concerns.

Notwithstanding the option to keep personal information from reaching the ER database, some purchasers may "opt in" (or be forced to) automatically register their purchased products, e.g., with the retailer and/or manufacturer. That is, because most if not all information typically used in product registrations becomes available, automatic registration of the product on the purchaser's behalf becomes possible. Indeed, the purchaser's name and contact information (e.g., address and phone number, possibly), and date and place of purchase, are all known to the kiosk and can be transmitted to the appropriate product registration databases. Furthermore, the UPC and serial number combination is known to the manufacturer or order fulfiller, thereby potentially identifying the product down to the individual item level. It is noted that the registration may become effective on any predetermined date such as, for example, the purchase date, the shipping date, the expected or actual delivery date, a product activation date, etc.

The technology disclosed herein may be particularly suitable for physically large items like appliances (e.g., washers, driers, dishwashers, refrigerators, etc.), televisions, etc.; expensive items; hard-to-get and/or hard-to-transport, etc. However, the techniques described herein may be used in connection with any products, product types, and/or product quantities, e.g., to help a retailer expand its offerings, etc. Further still, certain exemplary embodiments may relate to deployed services, as well, including, for example, custom delivery and/or installation services, service or maintenance contracts, telecommunications services, cable or satellite television and/or accessories, etc.

Certain exemplary embodiments have been described in connection with the manufacturer being the actual provider of the goods. However, this need not necessarily be the case, and the example techniques described herein can be used in situations where the actual supplier is any party including, for example, a warehousing operation run by manufacturer, a wholesaler, a distributor, or even a retailer; a wholesaler; a distributor; a strategic partner (or even other retailer); etc. Similarly, certain exemplary embodiments have been described in connection with the brick-and-mortar store or POS location being run by a retailer. However, this need not necessarily be the case in that, for example, a brick-and-mortar or POS location may be run by a manufacturer, wholesaler, distributor, e-tailer, or other party.

Certain exemplary embodiments may involve transmitting a unique identifier including a serial number and UPC combination as with normal ER operations and, in such cases, data for the ordered products may similarly include an order number that mimics or otherwise is processable as a serial number as well as a UPC. However, the unique identifier need not necessarily be of or include this information, and the information corresponding to the ordered products may change in a corresponding manner. Indeed, the techniques described herein may be tailored to the particular type of data normally used by a POS location or checkout system, with the mimicking information for the ordered products being adjusted to accordingly. Moreover, other product identifiers in place of, or in addition to, these data elements may be used in different embodiments. Furthermore, in addition to different data elements being used, different data types and/or representations may be used in different exemplary embodiments. For instance, EPC/RFID tags may be used in lieu of serial numbers and thus used for order numbers as well. However, such data may be processable through the POS location as if it were normal data for a normal sale thus may be provided to the ER system with the same stream of data and subsequently processed accordingly by the ER system itself.

Although certain exemplary embodiments have been described in connection with kiosks and order numbers, the example techniques disclosed herein are not so limited. For instance, certain exemplary embodiments may work with any kind of identifier (e.g., UPS shipping number; an identifier of a person such as, for example, a drivers license number, a credit card number, a full name, a social security number, a user name; etc.) in combination with a product identifier such as, for example, a UPC. Indeed, the masks can be used to detect and/or differentiate between any identifiers. Moreover, order numbers or other identifiers could be produced by any suitable computerized device such as, for example, a smart phone, PDA, website, desktop or laptop computer, etc.

While the invention has been described in connection with exemplary illustrative non-limiting implementations, it is to be understood that the invention is not to be limited to the disclosed implementations, but on the contrary, is intended to cover various modifications and equivalent arrangements included within the spirit and scope of the appended claims.

What is claimed is:

1. An order processing system, comprising:
a computer-based kiosk provided to a point-of-sale (POS) location, the kiosk being configured to (a) enable consumers to order, but not purchase, products that are not stocked by the POS location, (b) generate order numbers for ordered products, the order numbers being formatted in accordance with a first mask, and (c) generate, for a consumer who has ordered at least one product, an article including an order number and a product identifier pair for each said product being ordered;
a computerized POS checkout system provided to the POS location; and
an electronic registration (ER) system including at least one processor and an ER database, the ER system being configured to receive from the POS checkout system a data feed including unique identifiers of purchased products and create corresponding entries in the ER database, at least a portion of the unique identifiers being formatted in accordance with a second mask, the second mask being different from the first mask, wherein a supplier-side computer system is configured to receive first messages confirming that payment has been received for ordered products and, in response thereto, to initiate shipment of ordered and confirmed products and send second messages to the ER system when ordered and confirmed products are shipped, the second messages including associated order numbers and actual identifiers for the products being shipped, and wherein the ER system is configured to receive the second messages and associate, in the ER database, the actual identifiers from the second messages with the order numbers from the first messages;

wherein the POS checkout system is configured to:
process the generated article in order to complete a sale of each product ordered through the kiosk and associated with the generated article, and
treat the order number and the product identifier pair of each said product associated with the generated article as if they together were a unique identifier of the corresponding ordered product and include this information in the data feed, and wherein the ER system is further configured to:
analyze the data feed in order to separate out order number and product identifier pairs, from unique identifiers, and
send a first message indicating that payment has been received to a supplier of each product being ordered in a case that a corresponding order number and identifier pair is detected in the data feed.

2. The system of claim 1, wherein each said unique identifier includes a serial number and a UPC of the associated purchased product.

3. The system of claim 2, wherein the portion of the unique identifiers that is masked is the portion that corresponds to the serial number of the associated purchased product.

4. The system of claim 1, wherein product identifiers included with the articles are UPCs of the ordered products.

5. The system of claim 1, wherein the articles generatable by the kiosk are printed receipts.

6. The system of claim 5, wherein the printed receipts include barcodes of order numbers and product identifiers associated therewith.

7. The system of claim 1, wherein ordered and confirmed products are shipped to locations specified at the kiosk, bypassing the POS location.

8. The system of claim 1, wherein the kiosk is further configured to generate different order numbers for different suppliers.

9. The system of claim 1, wherein the supplier is a manufacturer, and the POS location is a retailer store.

10. The system of claim 1, wherein the actual identifiers for the products are actual serial numbers for the products.

11. An electronic registration (ER) system, comprising:
processing resources including at least one processor and a memory;
an ER database configured to store records of purchased products;
a return/warranty qualification module that, under control of the processing resources and in response to a return/warranty eligibility inquiry, is configured to issue a return/warranty qualification;
a connection to a checkout system of a store, the ER system being configured to receive, via the connection, a data feed from the checkout system, the data feed being formatted to include unique identifiers of purchased products, as well as pairs of order numbers and product identifiers for products ordered from, but not delivered by, the store; and
program logic that, under the control of the processing resources and for each entry in the data feed, is configured to:
create a corresponding record in the ER database,
determine whether the entry is either a unique identifier of a purchased product, or an order number/product identifier pair for a product ordered at the store by determining whether the entry is generated in connection with a first mask or a second mask, the first mask being indicative of a purchased product and the second mask being indicative of an ordered product, the second mask being different from the first mask,
effect transmission of an electronic message to a supplier of the product ordered at the store indicating that payment has been received for that product ordered at the store, when the program logic determines that the entry is an order number/product identifier pair,
enable receipt, from the supplier, of an indication that a product has been or is being shipped, along with an actual identifier of the product that has been or is being shipped,
update the corresponding record in the ER database with the actual identifier, the indication including the associated order number and the actual identifier for the product being shipped, and
associate, in the ER database, the actual identifier with the order number.

12. The system of claim 11, wherein each said entry in the data feed includes a UPC, and either: a product serial number, or an order number.

13. The system of claim 12, wherein product serial numbers and order numbers are subjected to different masks, prior to their inclusion in the data feed, but remain processable by the checkout system as if they were the same.

14. The system of claim 11, wherein the actual identifier of the product is an actual serial number of the product.

15. A method of processing an order, the method comprising:
receiving, via a computer provided to a brick-and-mortar store, an order for a product that is sold but not stocked by the store, the computer being prevented from actually selling the ordered product;
generating, using the computer, an order number for the ordered product, the order number being formatted in accordance with a first mask; and
printing a receipt for the ordered product, the receipt including the order number and a product identifier for the ordered product,
wherein the receipt is processable by a checkout system of the store so as to complete a sale of the ordered product, the order number being treated as if it were an actual identifier formatted in accordance with a second mask that is different from the first mask, and
wherein a centralized computer system is configured to (a) receive from the checkout system a data feed including entries for both unique identifiers of purchased products and order numbers for ordered products, (b) generate messages confirming to one or more suppliers, as appropriate, that payment has been received for entries in the data stream that correspond to ordered products, and (c) receive, from the one or more suppliers, an indication that a product has been or is being shipped, along with an actual identifier of the product that has been or is being shipped, and update a corresponding record in a database within the centralized computer system with the actual identifier being associated with the order number.

16. The method of claim 15, wherein the actual identifier of the product is an actual serial number of the product.

17. A non-transitory computer readable storage medium tangibly storing instructions that, when executed by at least one processor of a computer, are configured to at least:
cause an order for a product that is sold but not stocked by the store to be received from a computer provided to a brick-and-mortar store, the computer being prevented from actually selling the ordered product;
generate, using the computer, an order number for the ordered product, the order number being formatted in accordance with a first mask; and
direct a receipt for the ordered product to be printed, the receipt including the order number and a product identifier for the ordered product,
wherein the receipt is processable by a checkout system of the store so as to complete a sale of the ordered product, the order number being treated as if it were an actual identifier formatted in accordance with a second mask that is different from the first mask, and
wherein a centralized computer system is configured to (a) receive from the checkout system a data feed including entries for both unique identifiers of purchased products and order numbers for ordered products, (b) generate messages confirming to one or more suppliers, as appropriate, that payment has been received for entries in the data stream that correspond to ordered products, and (c) receive, from the one or more suppliers, an indication that a product has been or is being shipped, along with an actual identifier of the product that has been or is being shipped, and update a corresponding record in a database within the centralized computer system with the actual identifier being associated with the order number.

18. The non-transitory computer readable storage medium of claim 17, wherein the actual identifier of the product is an actual serial number.

19. A method of processing orders for products placed at, but not delivered by, a retailer, the method comprising:
receiving, from a point-of-sale (POS) system of the retailer and over a computer network connection, a data feed including unique identifiers of purchased, as well as pairs of order numbers and product identifiers for products ordered from, but not delivered by, the retailer;
for each entry in the data feed, and in connection with at least one processor:
creating a corresponding record in an electronic registration (ER) database,
determining whether the entry is either a unique identifier of a purchased product, or an order number/product identifier pair for a product ordered at the retailer by determining whether the entry is generated in connection with a first mask or a second mask, the first mask being indicative of a purchased product and the second mask being indicative of an ordered product, the second mask being different from the first mask, and
transmitting an electronic message to a supplier of the product ordered at the retailer indicating that payment has been received for that product ordered at the retailer, when it is determined that the entry is an order number/product identifier pair; and
receiving, from the supplier, an indication that a product has been or is being shipped, along with an actual identifier of the product that has been or is being shipped, and updating the corresponding record in the ER database with the actual identifier along with the order number.

20. The method of claim 19, wherein the actual identifier of the product is an actual serial number.

21. A non-transitory computer readable storage medium tangibly storing instructions for processing orders for products placed at, but not delivered by, a retailer that, when executed by at least one processor of a computer, are configured to at least:
cause a data feed including unique identifiers of purchased, as well as pairs of order numbers and product identifiers for products ordered from, but not delivered by, the retailer to be received from a point-of-sale (POS) system of the retailer and over a computer network connection;
for each entry in the data feed:
create a corresponding record in an electronic registration (ER) database,
determine whether the entry is either a unique identifier of a purchased product, or an order number/product identifier pair for a product ordered at the retailer by determining whether the entry is generated in connection with a first mask or a second mask, the first mask being indicative of a purchased product and the second mask being indicative of an ordered product, the second mask being different from the first mask, and
effect transmission of an electronic message to a supplier of the product ordered at the retailer indicating that payment has been received for that product ordered at the retailer, when it is determined that the entry is an order number/product identifier pair; and
enable receipt, from the supplier, of an indication that a product has been or is being shipped, along with an actual identifier of the product that has been or is being shipped, and updating the corresponding record in the ER database with the actual identifier along with the order number.

22. The non-transitory computer readable storage medium of claim 21, wherein the actual identifier of the product is an actual serial number.

* * * * *

UNITED STATES PATENT AND TRADEMARK OFFICE
CERTIFICATE OF CORRECTION

PATENT NO. : 8,799,111 B2  
APPLICATION NO. : 13/464400  
DATED : August 5, 2014  
INVENTOR(S) : Jeremy Prellwitz et al.

Page 1 of 1

It is certified that error appears in the above-identified patent and that said Letters Patent is hereby corrected as shown below:

In the Specification

Column 7, Line 19:   The word "receive" should read --receipt--

Signed and Sealed this
Eleventh Day of November, 2014

Michelle K. Lee
*Deputy Director of the United States Patent and Trademark Office*